United States Patent [19]

Fujimura

[11] 4,205,806
[45] Jun. 3, 1980

[54] TAKE-UP MOTION FOR A TAPELIKE MATERIAL

[75] Inventor: Yasuo Fujimura, Kawaguchi, Japan

[73] Assignee: Mitsutoshi Yamada, Tokyo, Japan

[21] Appl. No.: 966,383

[22] Filed: Dec. 4, 1978

[30] Foreign Application Priority Data

Dec. 5, 1977 [JP] Japan ............................... 52-145814
Nov. 22, 1978 [JP] Japan ............................... 53-153437

[51] Int. Cl.² .......................................... B65H 75/02
[52] U.S. Cl. ................................................. 242/77.1
[58] Field of Search ..................... 242/77.1, 55, 55.16; 354/313, 314

[56] References Cited

U.S. PATENT DOCUMENTS

| 1,188,217 | 6/1916 | Stehle | 242/77.1 X |
| 3,062,469 | 11/1962 | Smith | 242/77.1 |
| 3,132,818 | 5/1964 | Hansen | 242/77.1 X |
| 3,906,966 | 9/1975 | Drake | 242/77.1 |

FOREIGN PATENT DOCUMENTS

645553  11/1950  United Kingdom ................... 242/77.1

*Primary Examiner*—Edward J. McCarthy
*Attorney, Agent, or Firm*—Remy J. VanOphem

[57] ABSTRACT

Disclosed is a take-up motion in which a guide member slidably disposed along an opening of a plate member on a rotatable member with a spiral groove slides radially along the opening, accompanying the rotation of the rotatable member, whereby a tapelike material is fitted into the groove.

11 Claims, 11 Drawing Figures

FIG. 2
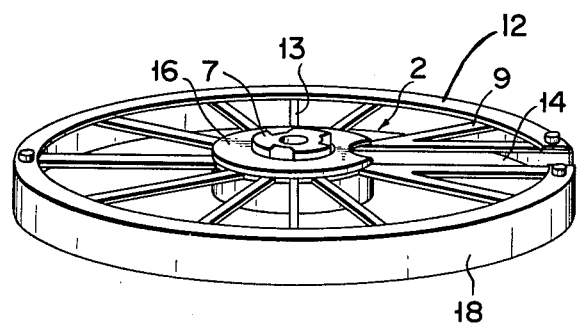
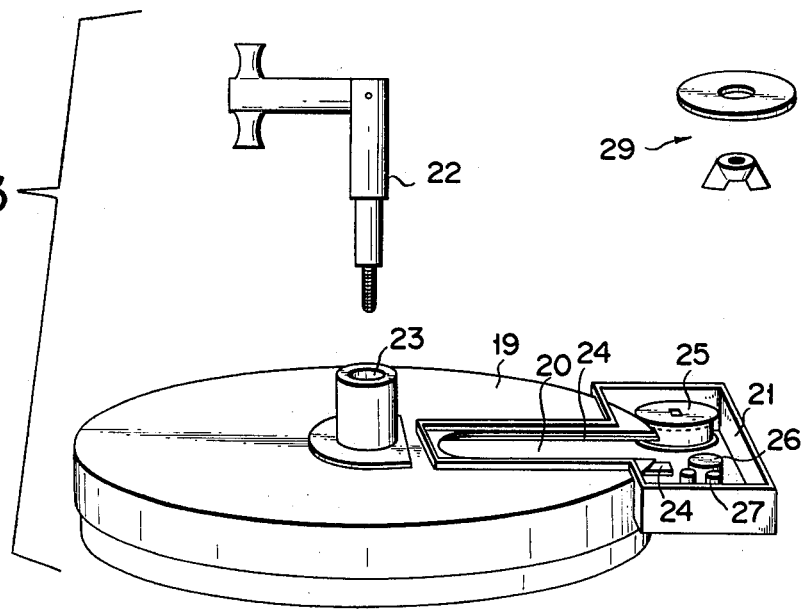
FIG. 3

TAKE-UP MOTION FOR A TAPELIKE MATERIAL

BACKGROUND OF THE INVENTION

This invention relates to a take-up motion for a tapelike material, such as a film, magnetic tape, etc.

Heretofore, there have been proposed various devices for compactly winding tapelike materials. One such device is provided with a spiral recess formed in a slanting surface in which a tapelike material is held. Since the surface in which the spiral recess is formed is inclined, therefor, this type of device cannot help being somewhat bulky. When using such take-up motion for developing a cinefilm, for example, it is hard to handle, requiring an extensive setting space. Moreover, in developing the film while it is set in this device, there would be required a large quantity of developer.

SUMMARY OF THE INVENTION

Accordingly, an object of this invention is to provide a take-up motion for a tapelike material capable of holding the tapelike material with improved compactness, and of quickly taking up the material by easy operation.

This invention can be more fully understood from the following detailed description when taken in conjunction with the accompanying drawings, in which:

BRIEF DESCRIPTION OF THE DRAWING

FIG. 2 is an assembly drawing of the frame of FIG. 1;

FIG. 3 is a general perspective view of the take-up motion of the invention;

DETAILED DESCRIPTION OF THE PREFERRED EMBODIMENT

Figure 1:
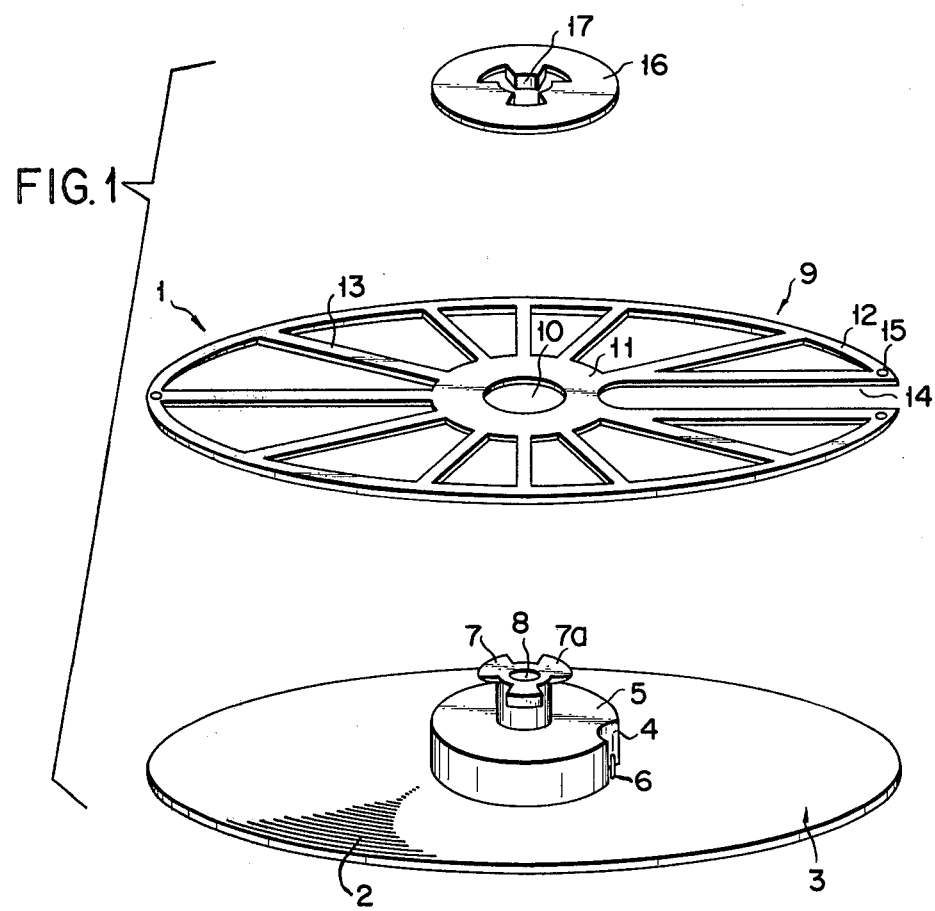
FIG. 1 is a partial perspective view of a disassembled frame of a take-up motion according to a first embodiment of this invention.

Referring now to FIG. 1, there is shown a disassembled view of a frame 1 of a take-up motion according to this invention. The frame 1 being circular, for example, is provided with a base plate 3 having a level surface on which a spiral groove 2 is arranged at regular intervals. At the central portion of the base plate 3; a cylindrical block 5 with a notch 4 is provided within which a pin 6 for fixing the tip end of a tapelike material protrudes from the base plate 3. On the cylindrical block 5 a stopper block 7 is provided, in the center of which a hole 8, penetrating the cylindrical block 5 and the base plate 3, is bored.

Numeral 9 designates a top plate mounted on the cylindrical block 5 which is attached to the base plate 3.

The top plate 9 is provided with a circular plate 11 with a center hole 10, a circular rim 12, a plurality of auxiliary bars 13 extending from the plate 11 to the circular rim 12, an opening 14 defining a fixed width from part of the plate 11 and crossing the rim 12, and tapped holes 15 in the rim 12. Thus, the top plate 9 is mounted by means of the hole 10 on the stopper block 7 attached to the cylindrical block 5 of the base plate 3. A stainless-steel plate may be attached along one side edge of the opening 14. The top plate 9 is rotatably mounted on the cylindrical block 5 on the base plate 3, and fixed to the base plate 3 by means of a stopper plate 16 as described below.

The stopper plate 16, having stopper clicks 17, engages the stopper block 7 to fix the top plate 9 to the base plate 3. The stopper clicks 17 interlock with stopper clicks 7a of the stopper block 7 through the top plate 9.

Referring now to FIG. 2, there is shown an outer frame 18 enclosing the outer periphery of the frame 1. The outer frame 18 is screwed to the rim 12 at the tapped holes 15. In this assembled frame, the base plate 3 alone can rotate. That is, it is necessary only that the grooved member be allowed to rotate and the plate with the opening be prevented from rotating; the relation between the vertical positions of the member and the plate is not significant.

In FIG. 3, numeral 19 denotes a cover which is so designed as to overspread the whole body of the frame assembled in such manner as shown in FIG. 1. The cover 19 is provided with an opening 20 shaped like the opening 14 of the top plate 9 at a position corresponding thereto, a tapelike material holding frame 21, and a socket 23 for a handled shaft 22 to rotate the base plate 3. The handled shaft 22 is fixed on the base plate 3 by means of a fixing member 29. Along the two side edges of the opening 20 extend rails 24 facing each other so that the inner end of each rail 24 is at a short distance from the inside edge of the opening 20 and the outer end projects slightly beyond the outside edge of the opening 20. In the holding frame 21, as definitely shown in FIG. 4, are a tapelike material setting means 25 and a pair of pinch rollers 26 and 27 so arranged that the tapelike material from the setting means 25 may be led straight to the pin 6 on the base plate 3 through the opening 20.

Figure 4:
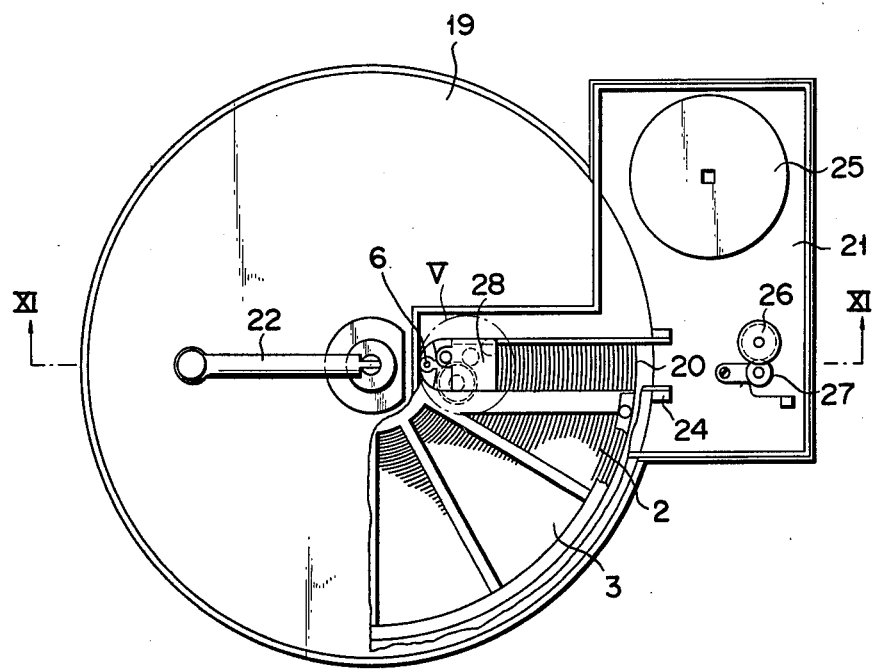
FIG. 4 is a plan of the take-up motion of FIG. 3.
Figure 5:
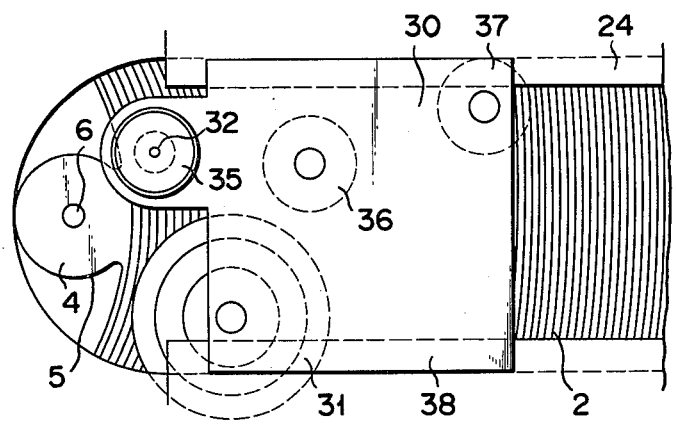
FIG. 5 is an enlarged plan of portion V of FIG. 4.
Figure 6:
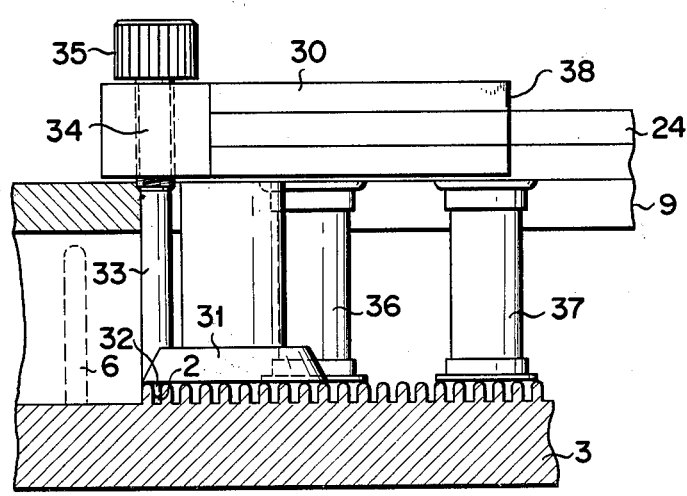
FIG. 6 is a side view of the principal part of FIG. 5.

Referring now to FIGS. 4 to 6, there will be described a means for guiding the tapelike material in the groove 2 to move outwardly from the center of the base plate 3 on the pair of rails 24 along the opening 20, accompanying the rotation of the base plate 3.

In this embodiment, the guiding means provides a sliding body 30 which moves on the rails 24 and is provided with a guide head 31 for guiding the tapelike material to the groove 2. Further, the sliding body 30 is provided with a rod 33 having at its bottom end a pin 32 to engage groove 2. A threaded portion 34 is formed at the top end of the rod 33, allowing the rod 33 to be moved up and down by turning a knob 35. The guide head 31 is suitably tapered at the outer periphery to guide the tapelike material into the groove 2. The guide head 31 is disposed ahead of the pin 32 of the rod 33, one end of the outermost periphery of the guide head 31 being continually located at the center of the width of a groove line inwardly adjacent to one in which the pin 32 is fitted.

Moreover, the sliding body 30 is provided with a guide roller 36 at a position where the tapelike material may always be directed toward the guide head 31 at a fixed angle, and also with an auxiliary roller 37 for smoothly leading the material to the guide roller.

The sliding body 30 further has sliding grooves 38 in which the rails 24 are fitted, whereby the body 30 will be allowed to slide on the rails 24. In this case, the guide head 31, guide roller 36, and the auxiliary roller 37 are so arranged as to slide over the groove 2.

Now there will be described the operation of this constructed take-up motion for a tapelike material. First, the top plate 9 is mounted on the base plate 3, and the base plate 3 is fixed by the stopper means 7 and 16. Then the cover 19 is set up with the opening 14 of the top plate 9 in alignment with the opening 20 of the cover 19, and the shaft 22 is inserted in place. The tapelike material held by the setting means 25 is passed between the pinch rollers 26 and 27, and fixed to the pin 6 protruding from the base plate 3. Thereafter, the sliding body 30 is fitted on the leading ends of the rails 24 with the tapelike material passed between the auxiliary roller 37 and the guide roller 36, and is slidably mounted outward over the rails to be located at the inside end of the opening 20. In this position, the knob 35 on the body 30 is turned to insert the pin 32 into the groove 2.

When such state is attained, the handled shaft 22 is turned clockwise. Thus, the tapelike material is led from the guide roller 36 to the tapered portion of the guide head 31, and is securely delivered into the groove 2 to be wound from inwardly. By continuing to turn the shaft 22, the sliding body 30 is moved while being guided by the pin 32, allowing the tapelike material to be fitted successively into the spiral groove.

Thus, according to this invention, the tapelike material may be continuously inserted in regular succession into the spiral groove formed in the level-surfaced plate, so that the material can be compactly held and quickly, securely fitted into the groove by only turning the handled shaft.

Although in this embodiment the shaft is turned clockwise, it may alternatively be rotated counterclockwise.

Figure 7:
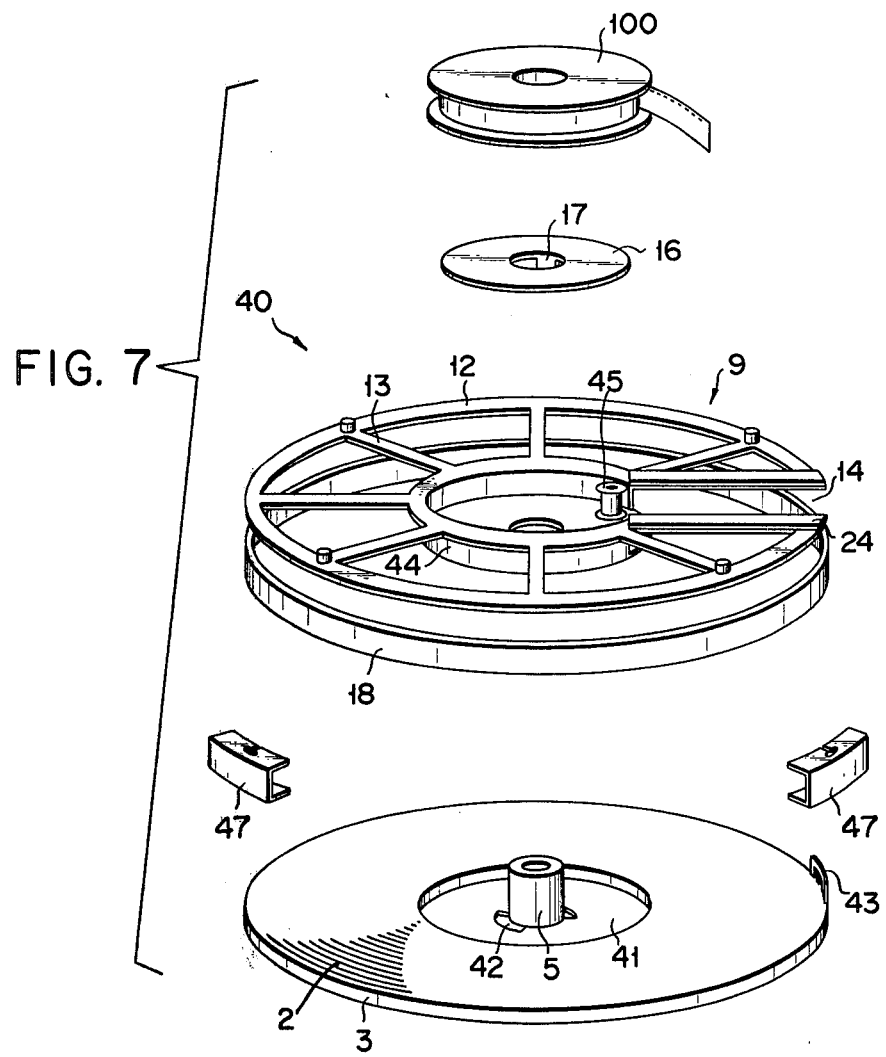
FIG. 7 is a partial perspective view of a disassembled frame of a take-up motion according to a second embodiment of the invention.
Figure 8:
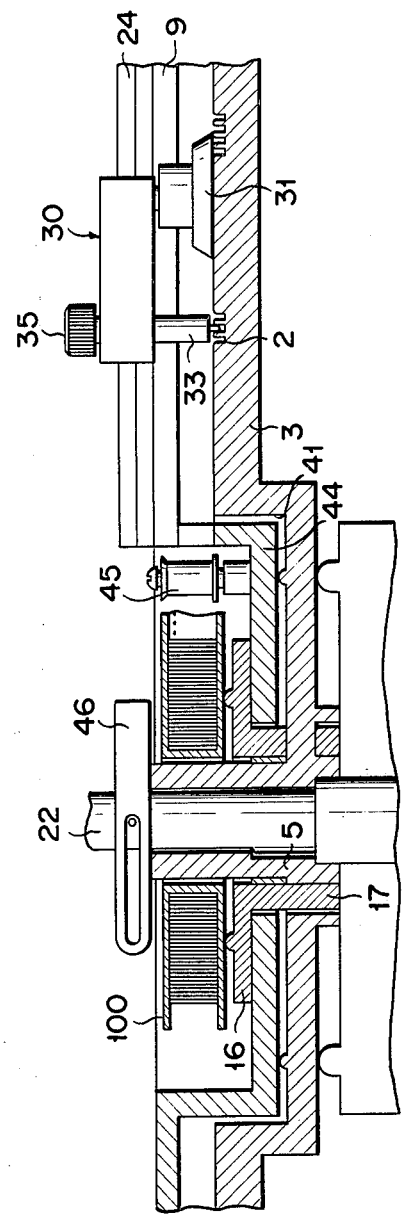
FIG. 8 is a sectional view of the principal part of the take-up motion of the second embodiment as shown in FIG. 7.

Referring now to FIGS. 7 and 8, there will be described in detail a take-up motion according to a second embodiment of this invention.

In these drawings, like reference numerals refer to the same parts or members. Numeral 40 designates a frame of the take-up motion for a tapelike material according to the invention. The frame 40 is of a circular shape, for example, and provided with a base plate 3 having a level surface on which a spiral groove 2 is arranged at regular intervals. In the central portion of the base plate 3 a recess 41 is provided, in which a cylindrical block 5 is formed integrally. Stopper slots 42 are formed in the base plate 3 near the vicinity of the cylindrical block. At a portion of the outer periphery of the base plate 3, there is provided a mooring member 43 to which the tip end of the tapelike material is moored.

Numeral 9 denotes a top plate mounted on the base plate 3, to the central portion of which a holding frame 44 is attached, the frame 44 having its top opened and bottom closed so that a cassette 100 holding the tapelike material may be inserted from above. Further, the top plate 9 is provided with a circular rim 12, a plurality of auxiliary bars 13 extending from the frame 44 to the rim 12, and an opening 14 defining a fixed width from part of the frame 44 and crossing the rim 12. Along the two sides of the opening 14 extend a pair of rails 24 facing each other. Inside the holding frame 44, there is disposed a guide roller 45 for guiding the tapelike material near the mouth of the opening 14.

Numeral 16 designates a stopper plate with stopper clicks 17 which is fitted in the holding frame 44 to fix the top plate 9 to the base plate 3. The stopper plate 16 engages the stopper slots 42 of the base plate 3 by means of the stopper clicks 17 so that it may not rotate with the base plate if turning force is applied to the base plate 3 through the top plate 9. Numeral 22 denotes a shaft which is engagedly (not shown) inserted in the cylindrical block 5 of the base plate 3 so that the base plate 3 alone may rotate without turning the cassette 100, stopper plate 16, and top plate 9. Further, the shaft 22 is fitted with a pressure lever 46 on top of the cassette, whereby the cassette is prevented from coming off the shaft in rotation. The shaft 22 is connected to a drive source (not shown) thereunder. Numeral 18 denotes an outer frame enclosing the outer peripheries of the base and top plates. The outer frame 18 is fixed to the base and top plates by means of fixing frames 47.

Meanwhile, the sliding body for guiding the tapelike material to the groove 2 while moving from the outside toward the center of the base plate 3 on the pair of rails along the opening 20, accompanying the rotation of the base plate, is of the same construction as the sliding body of the first embodiment.

Now there will be described the operation of the above-mentioned take-up motion for a tapelike material.

First, the holding frame 44 of the top plate 9 is inserted into the recess 41 of the base plate 3. In this state, the holding frame 44 of the top plate 9 is loaded with the cassette 100. Then the stopper plate 16 is fitted in the frame 44, and the top plate 9 and the base plate 3 are fixed to each other. Thereafter, the shaft 22 is inserted into the cassette 100 from under through the hole of the base plate 3, and the cassette 100 is pressed by means of the lever 46. The outer frame 18 is fixed around the top plate 9 and the base plate 3.

Subsequently, the top end of the tapelike material held in the cassette is drawn out through the guide roller 45, and moored to the mooring member 43 on the outer periphery of the base plate 3 through the groove 2 of the base plate 3. Thereafter, the sliding body 30 is fitted on the rails 24 with the tapelike material passed between the auxiliary roller 37 and the guide roller 36, and is shifted to the outermost end of the opening 14 of the top plate. In this position, the knob 35 on the body 30 is turned to fit the pin 32 into one groove line of the groove 2.

When such state is attained, the handled shaft 22 is turned clockwise. Thus, the tapelike material is led from the guide roller 36 to the tapered portion of the guide head 31, and is securely delivered into the groove 2. Accompanying the delivery of the material into the groove, the sliding body 30 slides inwardly from the outside end on the rails.

Thus, the tapelike material may be continuously inserted in regular succession into the spiral groove formed in the level-surfaced plate, so that the material can be compactly held and quickly, securely fitted into the groove by only turning the handled shaft.

Figure 9:
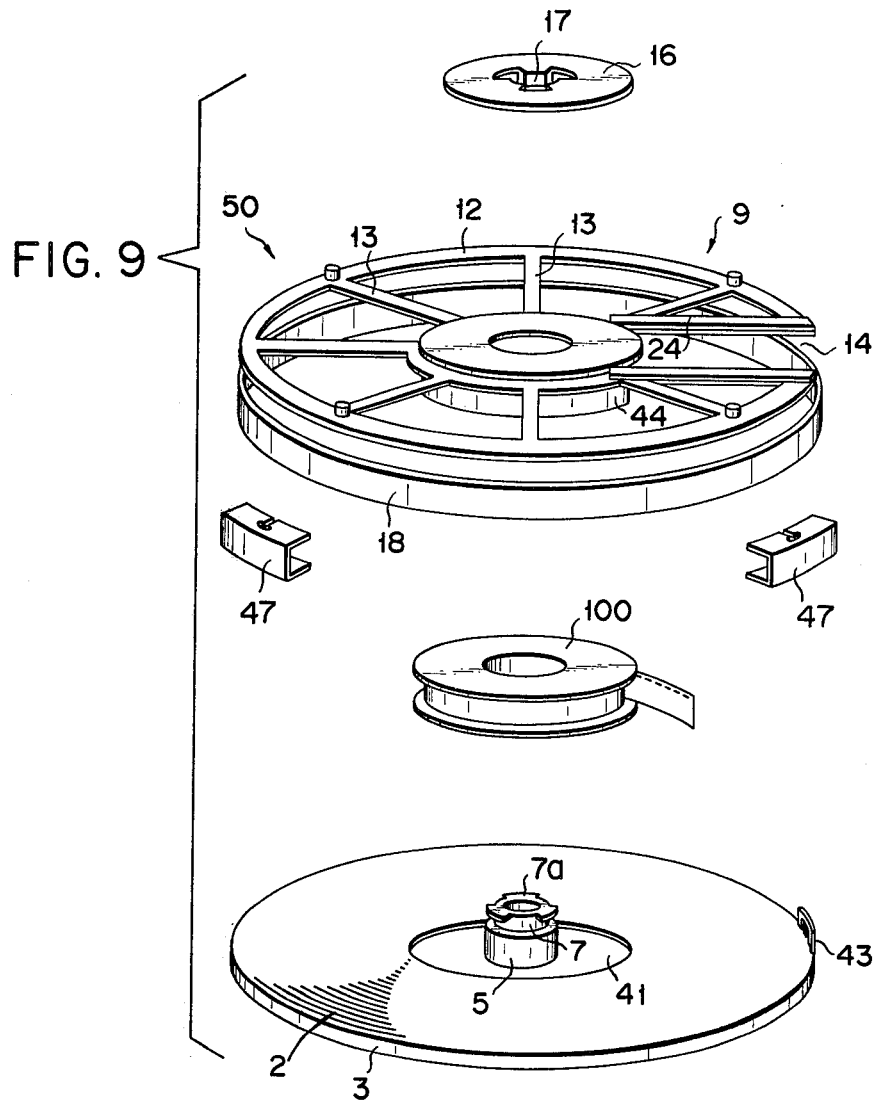
FIG. 9 is a partial perspective view of a disassembled frame of a modification of the take-up motion of the second embodiment.
Figure 10:
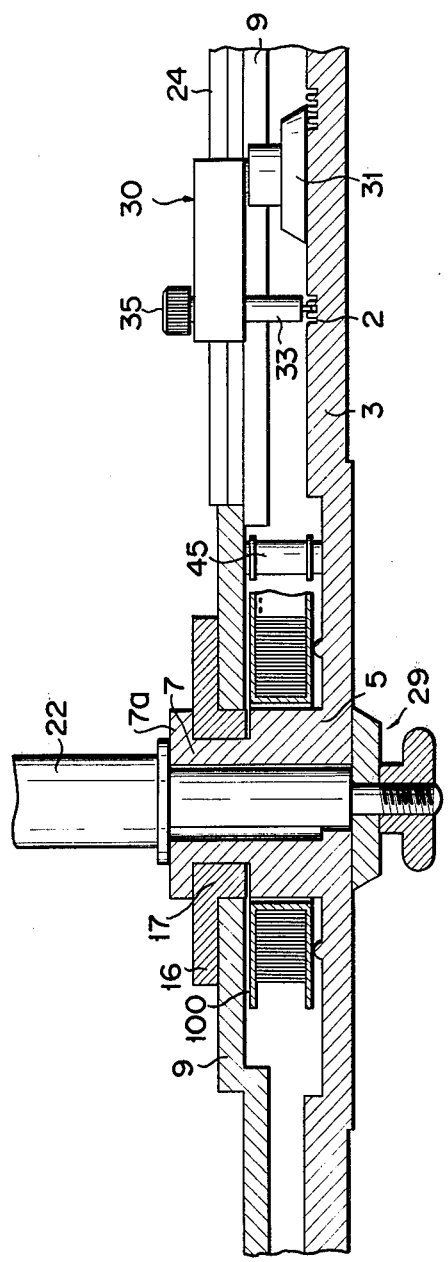
FIG. 10 is a sectional view of the principal part of the take-up motion of FIG. 9.

Referring now to FIGS. 9 and 10, there will be described in detail a modification of the take-up motion according to the third embodiment of the invention.

Numeral 50 designates a frame of the modification of the take-up motion of the third embodiment. There will hereinafter be described only the differences between this modification and the take-up motion of the second embodiment. On the base plate 3, there is disposed the cylindrical block 5 on which the stopper block 7 is integrally provided with the stopper clicks 7a instead of the stopper slots 42. The holding frame 44 of the top plate 9 has its top closed and bottom opened. Also in this modification, the base plate alone can rotate without turning the top plate and cassette when turning force is applied.

In such construction, the cassette 100 is fitted in the recess 41 of the base plate 3, the frame 44 of the top plate 9 is put on the cassette 100, and the stopper clicks 17 of the stopper plate 16 are engaged with the stopper clicks 7a of the base plate 3, thereby fixing the top plate 9 to the base plate 3. The shaft 22 is inserted from above, and fixed at the bottom end by means of a screw 29.

The mechanism for guiding the tapelike material into the groove 2 is just the same as the aforementioned one.

Since this modification shares the operation and effect with the second embodiment, description of such operation and effect is omitted here.

Now there will be described an application of the take-up motion according to this invention; use for a processor, especially for winding of cinefilms to be developed.

In winding a 16 mm cinefilm of 100-foot length, for example, the base plate 3 used may have a diameter of 320 mm and a spiral groove with 1 mm pitch. The guide head 31 is formed with a taper angle of approximately 30°, and the admission angle of the film from the guide roller 36 to the guide head 31 is restricted to a range of 40° to 45°. The take-up motion is so designed as to realize these dimensions. The material of this device is to resist a developer and the like.

Figure 11:
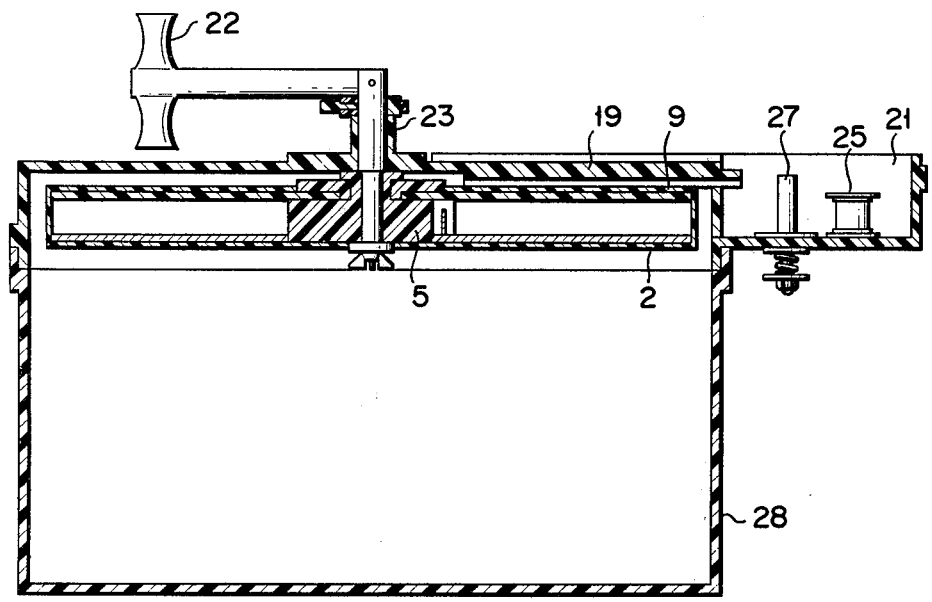
FIG. 11 is a sectional view of the take-up motion of FIG. 4 with a tank attached to the bottom thereof as taken along line XI—XI of FIG. 4.

Like the cases with the aforementioned embodiments, the film may be inserted to a spiral groove formed at regular intervals in a level surface. When using this take-up motion in a darkroom, the cover is removed, and the device is offered for development. When using the device in the light, a developing tank 28 is installed under the base plate 3, and the exposed portion of the cover 19 is hidden, as shown in FIG. 11.

Thus, even a long cinefilm may be compactly held and arranged in the groove at regular intervals, thereby permitting satisfactory development free from developing marks. Since the film winding operation is simple, cinefilms may be developed even at home. Moreover, the device is compact and requires less developer.

What is claimed is:

1. A take-up motion for a tapelike material comprising:
    a rotatable member with a spiral groove formed on a level surface thereof;
    a guide mechanism radially sliding in accordance with rotation of said rotatable member so that the tapelike material is guided into said groove, said guide mechanism further comprising:
    a plate member free from the rotation of said rotatable member, said plate member having an opening defining a fixed width along the radius of said plate member; and
    a guide member radially sliding along said opening of said plate member.

2. A take-up motion for a tapelike material according to claim 1, wherein said guide member includes a guide roller and an auxiliary roller between which the tapelike material is passed, a guide head tapered at the bottom end thereof to lead said tapelike material into said groove, and a guide pin to be continually fitted in a vacant groove line ahead of one in which said tapelike material is held.

3. A take-up motion for a tapelike material according to claim 2, wherein said guide head is formed with a taper angle of approximately 30° so that the admission angle of the tapelike material from said guide roller to said guide head may range from 40° to 45°.

4. A take-up motion for a tapelike material according to claim 1, wherein said plate member is mounted on said rotatable member with said groove.

5. A take-up motion for a tapelike material according to claim 1 further comprising a tapelike material setting frame.

6. A take-up motion for a tapelike material according to claim 5, wherein said setting frame is disposed outside said rotatable member with said groove, and a tapelike material mooring member is attached to the central portion of said rotatable member correspondingly to the opening of said plate member, the tapelike material being stretched tight between said setting frame and said mooring member.

7. A take-up motion for a tapelike material according to claim 6, wherein said guide member sliding along the opening of said plate member slides out from the innermost edge of said opening.

8. A take-up motion for a tapelike material according to claim 5, wherein said setting frame is disposed at the central portion of said rotatable member with said groove, and a tapelike material mooring member is attached to the outermost edge of said rotatable member correspondingly to the opening of said plate member, the tapelike material being stretched tight between said setting frame and said mooring member.

9. A take-up motion for a tapelike material according to claim 8, wherein said guide member sliding along the opening of said plate member slides inward from the outermost edge of said opening.

10. A take-up motion for a tapelike material according to claim 8, wherein said setting frame is loaded with a cassette holding the tapelike material.

11. A take-up motion for a tapelike material according in claim 1, wherein said tapelike material is a cinefilm.

* * * * *

UNITED STATES PATENT AND TRADEMARK OFFICE
CERTIFICATE OF CORRECTION

PATENT NO. : 4,205,806
DATED : June 3, 1980
INVENTOR(S) : Yasuo Fujimura

It is certified that error appears in the above-identified patent and that said Letters Patent are hereby corrected as shown below:

Column 3, line 29 after the word "wound" insert the word ----outwardly----.

Signed and Sealed this

Second Day of September 1980

[SEAL]

Attest:

SIDNEY A. DIAMOND

Attesting Officer

Commissioner of Patents and Trademarks